United States Patent [19]

Epperly et al.

[11] Patent Number: 4,777,024

[45] Date of Patent: Oct. 11, 1988

[54] MULTI-STAGE PROCESS FOR REDUCING THE CONCENTRATION OF POLLUTANTS IN AN EFFLUENT

[75] Inventors: William R. Epperly, New Canaan, Conn.; Jeremy D. Peter-Hoblyn, Cornwall, England; George F. Shulof, Jr., Wilton; James C. Sullivan, Westport, both of Conn.

[73] Assignee: Fuel Tech, Inc., Stamford, Conn.

[21] Appl. No.: 22,716

[22] Filed: Mar. 6, 1987

[51] Int. Cl.$^4$ .............................................. C01B 21/00
[52] U.S. Cl. ..................................................... 423/235
[58] Field of Search ................... 423/235, 235 D, 239, 423/239 A

[56] References Cited

U.S. PATENT DOCUMENTS

| | | |
|---|---|---|
| 3,801,696 | 4/1974 | Mark . |
| 3,846,981 | 11/1974 | Paczkowski . |
| 3,900,554 | 8/1975 | Lyon . |
| 4,115,515 | 9/1978 | Tenner et al. ........................ 423/235 |
| 4,208,386 | 6/1980 | Arand et al. ........................ 423/235 |
| 4,325,924 | 4/1982 | Arand et al. ........................ 423/235 |
| 4,507,069 | 3/1985 | Dean et al. . |
| 4,624,840 | 11/1980 | Dean et al. . |

FOREIGN PATENT DOCUMENTS

| | | | |
|---|---|---|---|
| 2630202 | 3/1977 | Fed. Rep. of Germany | 423/235 |
| 50-67609 | 12/1976 | Japan . | |
| 51-11380 | 7/1977 | Japan . | |
| 1514588 | 7/1977 | Japan . | |
| 51-12330 | 8/1977 | Japan . | |
| 51-89176 | 2/1978 | Japan . | |
| 53-30975 | 3/1978 | Japan | 423/235 |
| 53-128023 | 11/1978 | Japan | 423/235 |
| 54-123573 | 9/1979 | Japan | 423/235 |

Primary Examiner—Gregory A. Heller
Attorney, Agent, or Firm—St. Onge Steward

[57] ABSTRACT

A process is presented for reducing the concentration of pollutants in an effluent from the combustion of a carbonaceous fuel. The process comprises injecting a first treatment agent into the effluent at a first temperature zone and injecting a second treatment agent into the effluent at a second temperature zone, wherein the first and second treatment agents are injected under conditions effective to reduce the effluent pollution index.

24 Claims, No Drawings

MULTI-STAGE PROCESS FOR REDUCING THE CONCENTRATION OF POLLUTANTS IN AN EFFLUENT

TECHNICAL FIELD

The present invention relates to a process for reducing the concentration of pollutants, especially pollutants such as nitrogen oxides ($NO_x$) in the effluent from the combustion of a carbonaceous fuel. Preferably, the effluent is the oxygen-rich effluent from the combustion of a carbonaceous fuel.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Even in circulating fluidized bed boilers that operate at temperatures of 1300° F. to 1600° F., significant amounts of nitrogen oxides can be formed.

Nitrogen oxides are troublesome pollutants which are found in the combustion effluent streams of large utility and circulating fluidized bed boilers when fired as described above, and comprise a major irritant in smog. It is further believed that nitrogen oxides often undergo a process known as photo-chemical smog formation, through a series of reactions in the presence of sunlight and hydrocarbons. Moreover, nitrogen oxides are a significant contributor to acid rain.

Unfortunately, the high temperatures within boilers render most common methods of reducing $NO_x$ concentrations, such as effluent scrubbing or catalyst grids, uneconomical, infeasible, or both.

BACKGROUND ART

Many different processes and compositions have been proposed for chemically reducing nitrogen oxide levels in an effluent. These proposals call for adding chemicals, dry or in solution, directly to the effluent and achieve significant $NO_x$ reductions. However, none have been identified which add a number of different chemicals at defined, distinct temperature zones to achieve $NO_x$ reductions of greater than 50%, and preferably greater than 75%, with commercially practical residence times. Moreover, some of the techniques are capable of reducing $NO_x$ only at the expense of creating undesirable levels of other pollutants such as ammonia and/or carbon monoxide.

In U.S. Pat. No. 3,900,554, Lyon discloses reducing nitrogen monoxide (NO) in a combustion effluent by injecting ammonia, specified ammonia precursors or their aqueous solutions into the effluent for mixing with the nitrogen monoxide at a temperature within the range of 1600° F. to 2000° F. Lyon also suggests the use of reducing agents, such as hydrogen or various hydrocarbons, to permit the effective use of ammonia at effluent temperatures as low as 1300° F. Although the patent suggests staged injection of the ammonia composition, there remains no teaching of the efficacy of injecting distinct compositions at different temperature zones to optimize $NO_x$ reduction without producing a substantial amount of other pollutants.

In U.S. Pat. No. 4,208,386 Arand et al. disclose that, for oxygen-rich effluents, the temperature of the effluent should be in the range of 1300° F. to 2000° F. for reducing the nitrogen oxides concentration using urea added dry or in aqueous solution. Alkanoic solvents are said to be reducing agents which, like hydrogen, carbon monoxide, etc., enable the effective operating temperature to be lowered to below 1600° F. Disclosed again is the suggestion to inject in increments, but these incremental injections are of the same urea composition and must all be at positions meeting the same temperature and oxygen concentration conditions. The same holds true for U.S. Pat. No. 4,325,924 to Arand et al.

Although the prior art discloses injection of a composition for reducing nitrogen oxides at a number of spaced positions in, for instance, Bowers, in copending and commonly assigned U.S. Pat. No. 4,751,065, and Bowers, in copending and commonly assigned U.S. Pat. No. 4,719,092, each disclosure is related to the injection of the same composition at locations in which the same conditions, such as temperature and oxygen concentration, exist.

Furthermore, although the reduction of the concentration of nitrogen oxides in an effluent to as great an extent as possible is highly desirable, prior art systems for reducing $NO_x$ concentrations are limited, not only by the amount of $NO_x$ reduction that can be achieved utilizing them, but also by the amount of other pollutants, such as ammonia or carbon monoxide, generated as byproducts of the $NO_x$-reducing process.

What is desired, therefore, is a process for substantially reducing the concentration of nitrogen oxides in an effluent while maintaining a suitably low level of other pollutants.

DISCLOSURE OF INVENTION

This invention relates to a process for reducing the concentration of a pollutant in the effluent from the combustion of a carbonaceous fuel. One of the objectives of the invention is to achieve the desired level of pollutant control, such as a significant reduction in nitrogen oxides concentration, while minimizing other harmful emissions such as ammonia and carbon monoxide, and maximizing the utilization of the chemicals employed.

More particularly, the present invention comprises a process which serially treats the effluent from the combustion of a carbonaceous fuel by injecting different treatment agents at different effluent temperatures. For example, a first treatment agent is injected into the effluent at a first temperature zone, a second treatment agent is injected into the effluent at a second temperature zone, and the process is repeated, if desired, to achieve the desired level of pollutant control. The term "treatment agent" as used in this description should be understood to refer to a composition comprising a reductant chemical, i.e., a pollution reducing chemical capable of reducing $NO_x$, sulfur oxides ($SO_x$) or other pollutants, and, preferably, a solvent. The composition of each treatment agent is formulated to be effective at reducing the concentration of the target pollutant, especially nitrogen oxides, in the effluent when injected into the effluent at the designated temperature zone.

It has been found that nitrogen oxide reduction can be improved by increasing the amount of reductant chemical employed in the treatment agent. However, a point is reached where emissions of other pollutants such as ammonia are experienced. The emission of such other pollutants is undesirable. For instance, the emission of ammonia can lead to harmful deposits of ammonium bisulfate. Furthermore, carbon monoxide can also be produced. This limits the amount of nitrogen oxides control possible in any one treatment step. It has also been found that different chemical formulations are effective at reducing nitrogen oxides concentration at different temperatures.

Moreover, it is not possible to inject chemicals in every location in a boiler, because of design considerations. The injection must occur in a location where space is available inside the boiler for distribution of chemicals. Injection directly on heat exchange tubes could lead to harmful deposits and ineffective use of chemicals. As a practical matter, adequate space for injection may typically exist in a boiler at two to four locations, and these will be at different temperatures because of the heat transfer taking place.

In the practice of this invention, nitrogen oxides reduction is maximized by selecting the locations at which injection is possible, formulating treatment agents that are effective at reducing the nitrogen oxides level at the temperature at each location, injecting the chemicals at each location to maximize reduction while avoiding other emissions such as ammonia and carbon monoxide, and controlling the injection process as boiler load varies. For example, if boiler load drops from 100% to 50%, temperatures at each location may be lowered and changes in injections (amount, composition, or both) may be needed.

This invention can be used to achieve a given level of nitrogen oxides control and also to minimize the chemical cost of doing so. To accomplish this, use of the least expensive treatment agent is preferably maximized first, followed by the next least expensive treatment agent, etc., until the desired level of control is achieved.

Although this description is written in terms of the reduction of the concentration of nitrogen oxides in the effluent, the skilled artisan will recognize that the process of this invention may be equally applicable to the reduction of other pollutants which may be found in the effluent from the combustion of a carbonaceous fuel. Furthermore, although written in terms of utilization in a suspension-fired boiler, the description should be understood to be equally applicable to other types of units such as circulating fluidized bed boilers firing a variety of fuels including refuse.

For the purposes of this description, the term "temperature zone" refers to a locale wherein, under steady state conditions, the effluent temperature is within a certain range; the term "oxygenated hydrocarbon" refers to a hydrocarbon which contains oxygen or an oxygen-containing group; the term "hydroxy amino hydrocarbon" refers to a hydrocarbon in which at least one hydrogen is replaced by a hydroxy (OH) group and at least one hydrogen is replaced by an amine group; the term "alcohol" refers to a hydrocarbon derivative in which one or more hydrogen atoms have been replaced by a hydroxy group; the term "sugar" refers to a number of useful saccharide materials which are capable of decreasing the $NO_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides; the term "amino acid" refers to any organic compound containing an amine group and a carboxylic acid group (COOH); the term "protein" refers to a polymeric compound having amino acids as the structural unit; the term "skimmed milk" refers to milk having some or all of the fat removed; the term "powdered milk" refers to non-fat dry milk, available commercially as Carnation Instant Non-Fat Dry Milk from Carnation Company of Los Angeles, CA.

The presence of pollutants in an effluent may be referred to as the "pollution index", which is used herein to denote an index which indicates the presence of all of the pollutants in the effluent. It will be understood that reducing the concentration of one pollutant, such as nitrogen oxides, in the effluent in a process which simultaneously leads to the generation of another pollutant does not lower the pollution index. The present invention accomplishes the reduction of nitrogen oxides while substantially avoiding the production of other pollutants such as ammonia or carbon monoxide, thus effecting a net lowering of the pollution index of the effluent, by a step-wise or multi-stage process wherein a plurality of treatment fluids are injected into the effluent at a plurality of temperature zones.

The use of the terms "first", "second" and "third" treatment zones in this description is meant to denote relative locations of the treatment zones. For instance, the second temperature zone can be any zone where the effluent temperature is lower than the effluent temperature of the first temperature zone. Similarly, the third temperature zone can be any zone where the effluent temperature is lower than the effluent temperature in the second temperature zone, etc. This description should not be read as indicating that any specific temperature zone for injection must in all cases be in a location where the effluent is in a specific temperature range (i.e., the first temperature zone does not in all cases have to be in a location where the effluent temperature is in the range of about 1700° F. to about 2000° F.).

The treatment agent to be injected at any particular temperature zone is preferably chosen to be most effective at the effluent temperatures existing within that zone. For instance, if the first available temperature zone for injection is in an upstream location comprising a temperature zone where the effluent temperature is in the range of about 1700° F. to about 2000° F., the treatment fluid can be chosen to be that which is most effective in that temperature range, such as an aqueous solution of urea, as disclosed by copending and commonly assigned U.S. patent application entitled "Reduction of Nitrogen-Based Pollutants Through the Use of Urea Solutions Containing Oxygenated Hydrocarbon Solvents", Ser. No. 784,826, filed in the name of Bowers on Oct. 4, 1985, or an aqueous solution of ammonia, or gaseous ammonia itself, as disclosed by Lyon U.S. Pat. No. 3,900,554, the disclosures of which are incorporated herein by reference. Although the mechanism by which ammonia or urea decrease the concentration of nitrogen oxides is not fully understood, it is believed that they function by facilitating a series of reactions involving $NH_x$ radicals (x being an integer) and $NO_x$. The molar ratio of the concentration of $NH_x$ radicals to the concentration of $NO_x$ ($[NH_x]/[NO_x]$) is often referred to as the normalized stoichiometric ratio (NSR). If the geometry of the boiler permits, two injections can be made in an upstream location. The first can be further upstream in a temperature zone where the effluent temperature is about 1850° F. to about 2000° F. and the second at a location downstream from the first location in a temperature zone where the effluent temperature is about 1700° F. to about 1850° F. As indicated by the referenced disclosures, the urea or ammonia solution can be more concentrated (e.g., about 20% to about 50% urea or ammonia by weight) in the lower temperature location and more dilute (e.g., about 5% to about 20% urea or ammonia by weight) in the higher temperature location.

Appropriate temperature zones for injection according to the present invention may also be found downstream from the zones discussed above, where the effluent temperature is in the range of about 1350° F. to about 1750° F. Suitable treatment agents for injection into a temperature zone having such effluent temperatures are disclosed in copending and commonly assigned U.S. Pat. No. 4,751,065 entitled "Reduction of Nitrogen- and Carbon-Based Pollutants", and copending and commonly assigned U.S. patent application Ser. No. 014,431 entitled "Process for the Reduction of Nitrogen Oxides in an Effluent" filed in the name of Epperly et al. on Feb. 13, 1987, the disclosures of which are incorporated herein by reference. The disclosed treatment agents include aqueous solutions of ammonia or urea, enhanced with suitable enhancers such as hexamethylenetetramine (HMTA) and/or ethylene glycol.

The geometry of the boiler may also permit more than one temperature zone for injection within the effluent temperature range of about 1350° F. to about 1750° F. For example, an injection can be made at a location in a temperature zone where the effluent temperature is in the range of about 1550° F. to about 1750° F. A second location for injection can be in a temperature zone where the effluent temperature is in the range of about 1350° F. to about 1550° F. The treatment agent injected in the second of the indicated temperature zones can be similar to that of the first or can be less dilute, or comprise a different enhancer concentration, etc., as would be familiar to the skilled artisan upon reading the referenced disclosures.

Another temperature zone in a boiler at which injection may be made is at the location where the effluent temperature is below about 1400° F. As disclosed by copending and commonly assigned U.S. patent application Ser. No. 022,799 entitled "Process for Reducing Nitrogen Oxides in an Effluent Using a Hydrocarbon or Hydrogen Peroxide" filed Mar. 6, 1987, in the name of Sullivan, the disclosure of which is incorporated herein by reference, a suitable treatment agent for injection into the effluent at such effluent temperatures comprises a hydrocarbon, such as ethylene glycol or furfural, or hydrogen peroxide. More than one temperature zone for injection of a treatment agent can also be located within the lower effluent temperature locations in the boiler.

In a preferred embodiment, the process comprises injecting a first treatment agent into the effluent at a first temperature zone. For instance, in a large suspension-fired utility boiler, the location of injection of the first treatment fluid can be upstream from the superheater, such that the effluent temperature in the first temperature zone is greater than about 1700° F. The composition and amount of the first treatment agent can then be chosen to provide effective reduction of $NO_x$ concentration in an effluent which is at temperatures greater than about 1700° F. while minimizing the production of ammonia. Suitable formulations for use as the first treatment agent are those comprising aqueous solutions of urea or ammonia, or gaseous ammonia.

The terms urea and ammonia as employed in this description include the compounds urea and ammonia themselves, as well as compounds equivalent in effect. Among those compounds are ammonium carbonate, ammonium formate, ammonium oxalate, ammonium hydroxide and various stable amines, and their solutions in water.

The urea or ammonia aqueous solution functioning as the first treatment agent is preferably injected at a number of spaced positions within the first temperature zone from nozzles or other apparatus which are effective to uniformly form and disperse droplets of the solution within the flowing effluent stream to achieve uniform mixing.

The rate of injection of the first treatment agent into the effluent at the first temperature zone is preferably that rate which achieves maximum $NO_x$-concentration reduction up until the point of "ammonia breakthrough". "Ammonia breakthrough" is a term used in the art which refers to the point where a significant increase in the $NH_3$ concentration with rate of injection is observed. The actual rate of injection of the first treatment agent is determined experimentally by "tuning" the rate of injection to achieve the conditions described above, because the actual rate will vary with effluent stream flow rate, as well as the particular temperature at that temperature zone, which can vary within the given range due to the load at which the boiler is fired. Advantageously, in the situation where the temperature range within the first temperature zone is greater than about 1700° F., and the first treatment agent is a solution comprising urea or ammonia, the molar ratio of the nitrogen in the first treatment agent to the baseline nitrogen oxides level is about 1:5 to about 5:1, more preferably about 1:3 to about 3:1, and most preferably about 1:2 to about 2:1.

The temperature of the effluent will have an influence on the concentration of urea or ammonia in the solution. At temperatures of between about 1700° F. and about 1850° F., the solution will tend to operate most effectively at concentrations of about 20 to about 50 weight percent. Contrariwise, at temperatures of greater than about 1850° F., the concentration of the solution will typically be more dilute, such as about 5 to about 20 weight percent. Alternatively, when the effluent temperature is in the range of about 1700° F. to about 1850° F., the urea or ammonia solution which comprises the first treatment agent may be enhanced by the addition of hexamethylenetetramine. Other enhancers which may be suitable for use include guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof. It is also understood that the first treatment agent can comprise gaseous ammonia. In addition, depending on boiler configuration, it is anticipated that at least two temperature zones (e.g., one at a location where the effluent temperature is about 1850°

F. to about 2000° F. and another at a location where the effluent temperature is about 1700° F. to about 1850° F.) may be possible and/or desired upstream from the superheater, as discussed above.

The process of this invention preferably further comprises injecting a second treatment agent into the effluent at a second treatment zone located downstream from the first temperature zone. For instance, in a large suspension-fired utility boiler, the second temperature zone can advantageously be at a location downstream from the superheater, where the temperature in the second temperature zone will typically be in the range of about 1350° F. to about 1750° F. However, as discussed above, the second temperature can be any defined zone having temperatures lower than the first temperature zone, e.g., it may be above or below the temperature of about 1350° F. to about 1750° F. so long as it is below that of the first temperature zone. The composition of the second treatment agent is then preferably chosen to achieve optimal nitrogen oxides reduction without ammonia breakthrough in this temperature zone. Advantageously, the second treatment agent for use under these conditions comprises a mixture of urea or ammonia and an enhancer. Suitable enhancers which may be used include hexamethylenetetramine (HMTA), an oxygenated hydrocarbon such as methanol, ethylene glycol, glycerol, sugar, furfural, furfural derivatives such as hydroxymethyl furfural, and mixtures of ortho-, meta-, and para-methyl phenols, such as cresylic acid; hydroxy amino hydrocarbons such as monoethanolamine, amino acids; and protein-containing compositions such as skimmed milk or powdered milk;. Other enhancers which may be suitable for use include guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof. The most preferred enhancers under these conditions are ethylene glycol, sugar and furfural.

The second treatment agent is injected into the effluent to provide a molar ratio of nitrogen in the agent to the baseline nitrogen oxides concentration suitable to maximize the reduction of $NO_x$ concentrations in the second temperature zone while minimizing the production of other pollutants, such as ammonia or carbon monoxide. Preferably, the mixture, when composed as described above, is injected so as to provide a molar ratio of nitrogen in the mixture to the baseline nitrogen oxides level of about 1:5 to about 5:1, more preferably about 1:3 to about 3:1 and most preferably about 1:2 to about 2:1. The enhancer is present in the agent in a weight ratio of enhancer to urea or ammonia of, preferably, about 1:10 to about 5:1, more preferably about 1:5 to about 3:1. Most preferably, the weight ratio of enhancer to urea or ammonia in the ammonia/enhancer agent is about 1:4 to about 2.5:1.

Typically, the agent is prepared by dissolving a water-soluble enhancer in water at a concentration of about 5 to about 25 weight percent, more preferably about 10 to about 20 weight percent, and the desired amount of urea or ammonia mixed in. The resulting mixture is then injected into the effluent at a number of spaced positions within the second temperature zone from nozzles or other apparatus which are effective to uniformly form and disperse droplets of the solution within the flowing effluent stream to achieve uniform mixing. As discussed above, there can be at least two temperature zones, if desired and boiler configuration permits, within the indicated effluent temperature range with at least two treatment agents injected thereinto.

A more preferred embodiment of the present invention comprises injection of a third treatment agent into the effluent at a third temperature zone, wherein the third temperature zone is located sequentially downstream from the first and second temperature zones. For instance, in a suspension-fired utility boiler, the third temperature zone can advantageously be located after the economizer where the effluent temperature will be within the range of about 800° F. to about 1400° F. Under these conditions, the third treatment agent preferably comprises a hydrocarbon or hydrogen peroxide. The most preferred hydrocarbons suitable for use in the third treatment fluid under the indicated conditions are oxygenated hydrocarbons such as low molecular weight ketones, aldehydes, mono, di or polyhydric alcohols of aliphatic hydrocarbons and hydroxy amino hydrocarbons such as monoethanolamine and amino acetic acid (glycine). Ethylene glycol, methanol, furfural, sugar and glycerol are preferred oxygenated hydrocarbons for this purpose, with ethylene glycol and sugar being most preferred. Mixtures of polyols, such as those mixtures of low molecular weight polyols known as hydrogenated starch hydrosylates, can also be advantageously employed. Additional hydrocarbons which are suitable for use in the present invention include paraffinic, olefinic and aromatic hydrocarbons, including naphtha-based hydrocarbons, and mixtures thereof.

The hydrocarbon can be used alone in its pure form, in dispersions, preferably aqueous dispersions or in solution, preferably aqueous solution due to the economy of aqueous solutions, although there may be instances where other solvents may be advantageously used, either alone or in combination with water, as would be known to the skilled artisan. The level of the hydrocarbon employed should be that level necessary to elicit optimal reductions in the concentration of nitrogen oxides in the effluent while also minimizing the presence of other pollutants, such as ammonia and carbon monoxide. Advantageously, the hydrocarbon is employed at a weight ratio of hydrocarbon to the third baseline nitrogen oxides level of about 1:5 to about 5:1, most preferably about 1:2 to about 2:1. The exact amount of hydrocarbon employed may vary depending upon the overall economics of the process.

A hydrocarbon, when utilized as the third treatment agent according to this invention, is preferably injected into the effluent at a number of spaced positions within the third temperature zone from nozzles or other apparatus which are effective to uniformly form and disperse droplets of the hydrocarbon, either alone or in a dispersion or solution as discussed above, within the flowing effluent stream to achieve uniform mixing. Depending on boiler configuration, there can be two zones of injection in the temperature range of about 800° F. to about 1400° F.

It will be recognized that the use of the terms "first", "second" and "third" herein is merely for the sake of convenient description. The actual numbering sequence will vary depending on the actual number of temperature zones chosen and the number of treatment agents injected in each situation. This number can vary depending on boiler geometry (as discussed above) and the particular pollutant level desired.

The effluent from the combination of a carbonaceous fuel into which the treatment agents disclosed herein according to the present invention are injected is preferably oxygen-rich, meaning that there is an excess of oxygen in the effluent. Advantageously, the excess of oxygen is less than about 10% by volume. Most preferably, the excess of oxygen is in the range of about 1% to about 10% by volume.

In practicing the process of the present invention to maximize the reduction of the concentration of nitrogen oxides in the effluent, it is preferred to first "tune" the injection of the first treatment agent into the first temperature zone to optimize the injection (i.e., maximize $NO_x$ concentration reduction and minimize production of other pollutants). The injection of the second treatment agent into the second temperature zone is then "tuned", the injection of the third treatment agent into the third temperature zone (where a third treatment agent and third temperature zone are used) is advantageously "tuned" third, the injection of the fourth treatment agent into the fourth temperature zone (when a fourth treatment agent and fourth temperature zone are used) is preferably "tuned" fourth, etc., until the desired number of injections or level of pollutants is reached.

The identity of other pollutants which comprise the limiting emissions can vary from boiler to boiler, situation to situation, or temperature zone to temperature zone. For instance, at temperature zones where the effluent temperature is relatively high, the limiting emission can be ammonia, whereas at temperature zones where the effluent temperature is relatively low, the limiting emission can be carbon monoxide. Furthermore, it may not be necessary in each case to "tune" the injection at each temperature zone. Rather, it may be desirable to achieve maximum possible reduction at earlier temperature zones irrespective of the production of other emissions, provided that the level of such other emissions can be reduced at later, or the last, temperature zones. In other words, it is the pollution index after the final injection that is most significant, not the pollution index at intermediate levels.

Alternatively, to obtain a target level of $NO_x$ reduction while minimizing chemical cost, maximum use of the least expensive of the treatment agents without significant production of other pollutants is first established. The use of the next least expensive treatment agent is maximized next, and this process is repeated until the desired target level is reached.

It will be further understood that when economics, boiler load, target $NO_x$ levels or other considerations dictate, what was the second temperature zone in one situation can become the first temperature zone in another, and what was the third temperature zone in one situation can become the second temperature zone in another, etc. Moreover, the difference between any two consecutive treatment agents may be the dilution of the solutions which comprise the treatment agents.

BEST MODE FOR CARRYING OUT THE INVENTION

The following examples further illustrate and explain the invention by detailing the operation of the process for reducing nitrogen oxides concentration by multi-stage injection.

EXAMPLE I

The burner used in this example is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are injected is measured at the point of injection utilizing a K-type thermocouple. Atomizing injectors described in copending and commonly assigned U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the effluent flue conduit in order to introduce and distribute the $NO_x$-reducing agents into the effluent stream. The burner fuel is a Number 2 fuel oil, and the burner is fired at a rate of 9.6 lbs/hr to 10.9 lbs/hr.

A baseline nitrogen oxides concentration reading is taken prior to beginning each run to calculate the ratio of agents injected and to facilitate the calculation of the reduction in nitrogen oxides concentration, and a nitrogen oxides reading is taken during injection of each of the treatment agents to calculate the reduction in the nitrogen oxides concentration in the effluent elicited by each of the agents injected.

Seven runs were made employing the treatment agents described below. In each, a first treatment agent is injected into the effluent at the indicated temperature. The second treatment agent is injected into the effluent flue conduit at a position 43 inches downstream from the first treatment agent injection point and the third treatment agent, when used, is injected at a position 40 inches downstream from the second treatment agent injection point.

1. An aqueous solution comprising 10% by weight of urea and 0.2% by weight of a commercially available surfactant is injected as the first treatment agent at a rate of 100 ml/hr. into the effluent which is at a temperature of 1810° F.; and an aqueous solution comprising 5% by weight of urea, 25% by weight of ethylene glycol and 0.1% by weight of a commercially available surfactant is injected as the second treatment agent at a rate of 200 ml/hr. into the effluent which is at a temperature of 1600° F.

2. An aqueous solution comprising 10% by weight of urea and 0.2% by weight of a commercially available surfactant is injected as the first treatment agent at a rate of 200 ml/hr. into the effluent which is at a temperature of 1765° F.; and an aqueous solution comprising 5% by weight of urea, 25% by weight of ethylene glycol and 0.1% by weight of a commercially available surfactant is injected as the second treatment agent at a rate of 200 ml/hr. into the effluent which is at a temperature of 1545° F.

3. An aqueous solution comprising 10% by weight of urea and 0.2% by weight of a commercially available surfactant is injected as the first treatment agent at a rate of 100 ml/hr. into the effluent which is at a temperature of 1760° F.; and an aqueous solution comprising 10% by weight of urea, 30% by weight of sucrose and 0.2% by weight of a commercially available surfactant is injected as the second treatment agent at a rate of 200 ml/hr. into the effluent which is at a temperature of 1540° F.

4. An aqueous solution comprising 10% by weight of urea and 0.2% by weight of a commercially available surfactant is injected as the first treatment agent at a rate of 200 ml/hr. into the effluent which is at a temperature of 1765° F.; and an aqueous solution comprising 7.28% by weight of urea, 3.12% by weight of hexamethylenetetraamine, 15% by weight of ethylene glycol and 0.208% by weight of a commercially available surfactant is injected as the second treatment agent at a rate of 200 ml/hr. into the effluent at a temperature of 1545° F.

5. An aqueous solution comprising 10% by weight of urea and 0.2% by weight of a commercially available surfactant is injected as the first treatment agent at a rate of 200 ml/hr. into the effluent which is at a temperature of 1790° F.; an aqueous solution comprising 10% by weight of urea, 30% by weight of sucrose and 0.2% by weight of a commercially available surfactant is injected as the second treatment agent at a rate of 100 ml/hr. into the effluent at a temperature of 1560° F.; and an aqueous solution comprising 15% by weight of sucrose is injected as the third treatment agent at a rate of 100 ml/hr. into the effluent at a temperature of 1305° F.

6. An aqueous solution comprising 10% by weight of urea and 0.2% by weight of a commercially available surfactant is injected as the first treatment agent at a rate of 200 ml/hr. into the effluent which is at a temperature of 1790° F.; an aqueous solution comprising 10% by weight of urea, 30% by weight of sucrose and 0.2% by weight of a commercially available surfactant is injected as the second treatment agent at a rate of 100 ml/hr. into the effluent at a temperature of 1560° F.; and an aqueous solution comprising 15% by weight of glycerol is injected as the third treatment agent at a rate of 100 ml/hr. into the effluent which is at a temperature of 1305° F.

7. An aqueous solution comprising 10% by weight of urea and 0.2% by weight of a commercially available surfactant is injected as the first treatment agent at a rate of 200 ml/hr. into the effluent which is at a temperature of 1750° F.; an aqueous solution comprising 10% by weight of urea, 30% by weight of sucrose and 0.2% by weight of a commercially available surfactant is injected as the second treatment agent at a rate of 100 ml/hr. into the effluent at a temperature of 1530° F.; and kerosene is injected as the third treatment agent at a rate of 100 ml/hr. into the effluent which is at a temperature of 1295° F.

The results of the above-described runs are set out in Table 1.

TABLE 1

| Run | $NO_x$ Baseline ppm | $NO_x$ Final ppm | % reduction | $NH_3$ ppm |
|---|---|---|---|---|
| 1 | 240 | 120 | 50.0 | 4 |
| 2 | 218 | 75 | 65.6 | 21 |
| 3 | 220 | 92 | 58.2 | 19 |
| 4 | 218 | 83 | 61.9 | 30 |
| 5 | 210 | 42 | 80.0 | 21 |
| 6 | 210 | 39 | 81.4 | — |
| 7 | 210 | 50 | 76.2 | — |

EXAMPLE II

The boiler used is a front fired coal design with a nominal 140 megawatt (thermal) per hour input. The temperature of the effluent which is measured at the first level of injection is approximately 1900° F. with an excess of oxygen of about 4.5% and the temperature of the effluent at the second level of injection is approximately 1750° F. with an excess of oxygen of about 8.2%.

An aqueous solution comprising 8.6% by weight of urea and 0.17% by weight of a commercially available surfactant is injected as the first treatment agent at a rate of 754 gallons/hr. to provide a normalized stoichiometric ratio (NSR) of treatment agent to baseline nitrogen oxides level of 1.79 and an aqueous solution comprising 16.5% by weight of urea and 0.33% by weight of a commercially available surfactant is injected as the second treatment agent at a rate of 91 gallons/hr. to provide an NSR of treatment agent to baseline nitrogen oxides level of 0.41.

The baseline $NO_x$ level is measured at 693 ppm and the $NO_x$ level measured during injection of the first treatment agent, measured upstream from injection of the second treatment agent, is approximately 251 ppm. The $NO_x$ level measured during injection of the first and second treatment agents is 145 ppm, which is an 79.1% reduction from the original baseline $NO_x$ level (all $NO_x$ levels are corrected so as to be standardized to 3% oxygen).

It will be apparent that by practice of the present invention, superior $NO_x$ reductions can be elicited without significant ammonia breakthrough.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing the concentration of nitrogen oxides in the effluent from the combustion of a carbonaceous fuel, the process comprising:

a. injecting a first treatment agent comprising urea or ammonia into the effluent at a first temperature zone where the effluent is at a temperature of greater than about 1700° F.;

b. injecting a second treatment agent comprising urea or ammonia, each of which further comprises an enhancer selected from the group consisting of hexamethylenetetramine, an oxygenated hydrocarbon, a hydroxy amino hydrocarbon, an amino acid, a protein-containing composition, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof into the effluent at a second temperature zone where the effluent temperature is about 1350° F. to about 1750° F.; and c. injecting a third treatment agent comprising a composition selected from the group consisting of paraffinic, olefinic, aromatic, oxygenated and hydroxy amino hydrocarbons and hydrogen peroxide, and mixtures thereof into the effluent at a third temperature zone where the effluent temperature is below about 1400° F.;

wherein said treatment agents are injected under conditions effective to reduce the effluent pollution index.

2. The process of claim 1 wherein said first treatment agent comprises an aqueous solution of urea.

3. The process of claim 1 wherein said second treatment agent comprises an aqueous solution of urea further comprising an oxygenated hydrocarbon.

4. The process of claim 1 wherein said third treatment agent comprises an aqueous solution of an oxygenated hydrocarbon.

5. A process for reducing the concentration of nitrogen oxides in the effluent from the combustion of a carbonaceous fuel, the process comprising:
   a. injecting a first treatment agent which comprises urea or ammonia into the effluent at a first temperature zone wherein the effluent temperature at said first temperature zone is greater than about 1700° F.; and
   b. injecting a second treatment agent which comprises urea or ammonia, each of which further comprises an enhancer selected from the group consisting of hexamethylenetetramine, an oxygenated hydrocarbon, a hydroxy amino hydrocarbon, an amino acid, a protein-containing composition, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof into the effluent at a second temperature zone wherein the effluent temperature at said second temperature zone is about 1350° F. to about 1750° F.;
wherein said first and second treatment agents are injected under conditions effective to lower the effluent pollution index.

6. The process of claim 5 which further comprises injecting a third treatment agent comprising a composition selected from the group consisting of paraffinic, olefinic, aromatic, oxygenated and hydroxy amino hydrocarbons and hydrogen peroxide, and mixtures thereof into the effluent at a third temperature zone where the effluent temperature is below about 1400° F.

7. The process of claim 6 wherein said third treatment agent comprises an aqueous solution of an oxygenated hydrocarbon.

8. The process of claim 5 wherein said first treatment agent comprises an aqueous solution of urea.

9. The process of claim 5 wherein said second treatment agent comprises an aqueous solution of urea further comprising an oxygenated hydrocarbon.

10. A process for reducing the concentration of nitrogen oxides in the effluent from the combustion of a carbonaceous fuel, the process comprising:
    a. injecting a first treatment agent into the effluent at a first temperature zone; and
    b. injecting a second treatment agent into the effluent at a second temperature zone;
wherein said first and second treatment agents are injected under conditions effective to lower the effluent pollution index, and further wherein the effluent temperature at said first and second temperature zones is about 1350° F. to about 1750° F. and wherein said first and said second treatment agents each comprise urea or ammonia, each of which further comprises an enhancer selected from the group consisting of hexamethylenetetramine, an oxygenated hydrocarbon, a hydroxy amino hydrocarbon, an amino acid, a protein-containing composition, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof.

11. The process of claim 10 which further comprises injecting a third treatment agent comprising a composition selected from the group consisting of paraffinic, olefinic, aromatic, oxygenated and hydroxy amino hydrocarbons and hydrogen peroxide, and mixtures thereof, into the effluent at a third temperature zone where the effluent temperature is below about 1400° F.

12. The process of claim 11 wherein said third treatment agent comprises an aqueous solution of an oxygenated hydrocarbon.

13. The process of claim 10 wherein said first and second treatment agents each comprise an aqueous solution of urea further comprising an oxygenated hydrocarbon.

14. A process for reducing the concentration of nitrogen oxides in the effluent from the combustion of a carbonaceous fuel, the process comprising:
    a. injecting a first treatment agent which comprises urea or ammonia, further comprising an enhancer selected from the group consisting of hexamethylenetetramine, an oxygenated hydrocarbon, a hydroxy amino hydrocarbon, an amino acid, a protein-containing composition, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof, into the effluent at a first temperature zone wherein the effluent temperature is about 1350° F. to about 1750° F.; and
    b. injecting a second treatment agent which comprises an enhancer selected from the group consisting of hydrogen peroxide and paraffinic, olefinic, aromatic, oxygenated and hydroxy amino hydrocarbons, into the effluent at a second temperature zone wherein the effluent temperature is below about 1400° F.;
wherein said first and second treatment agents are injected under conditions effective to lower the effluent pollution index.

15. The process of claim 14 wherein said second treatment agent comprises an aqueous solution of urea further comprising an oxygenated hydrocarbon.

16. The process of claim 14 wherein said third treatment agent comprises an aqueous solution of an oxygenated hydrocarbon.

17. A process for reducing the concentration of nitrogen oxides in the effluent from the combustion of a carbonaceous fuel, the process comprising:
    a. injecting a first treatment agent which comprises an aqueous solution comprising about 5% to about 20% of urea or ammonia into the effluent at a first temperature zone wherein the effluent temperature is greater than about 1850° F.;
    b. injecting a second treatment agent which comprises an aqueous solution comprising about 20% to about 50% of urea or ammonia into the effluent at a second effluent temperature zone wherein the effluent temperature is about 1700° F. to about 1850° F.; and c. injecting a third treatment agent which comprises urea or ammonia, each of which further comprises an enhancer selected from the group consisting of hexamethylenetetramine, an oxygenated hydrocarbon, a hydroxy amino hydrocarbon, an amino acid, a protein-containing composition, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea, and mixtures thereof, into the effluent at a third temperature zone wherein the effluent temperature is about 1350° F. to about 1750° F.;

wherein said treatment agents are injected under conditions effective to lower the effluent pollution index.

18. The process of claim 17 which further comprises injecting a fourth treatment agent comprising a composition selected from the group consisting of paraffinic, olefinic, aromatic, oxygenated and hydroxy amino hydrocarbons and hydrogen peroxide, and mixtures thereof, into the effluent at a fourth temperature zone where the effluent temperature is below about 1400° F.

19. The process of claim 18 wherein said fourth treatment agent comprises an aqueous solution of an oxygenated hydrocarbon.

20. The process of claim 17 wherein said third treatment agent comprises an aqueous solution of urea further comprising an oxygenated hydrocarbon.

21. A process for reducing the concentration of nitrogen oxides in the effluent from the combustion of a carbonaceous fuel, the process comprising:

a. injecting a first treatment agent which comprises an aqueous solution comprising about 5% to about 20% of urea or ammonia into the effluent at a first temperature zone wherein the effluent temperature is greater than about 1850° F.;

b. injecting a second treatment agent which comprises an aqueous solution comprising about 20% to about 50% of urea or ammonia into the effluent at a second effluent temperature zone wherein the effluent temperature is about 1700° F. to about 1850° F.; and c. injecting a third treatment agent which comprises an enhancer selected from the group consisting of hydrogen peroxide and paraffinic, olefinic, aromatic, oxygenated and hydroxy amino hydrocarbons, into the effluent at a third temperature zone wherein the effluent temperature is below about 1400° F.;

wherein said treatment agents are injected under conditions effective to lower the effluent pollution index.

22. The process of claim 21 wherein said third treatment agent comprises an aqueous solution of an oxygenated hydrocarbon.

23. A process for reducing the concentration of nitrogen oxides in the effluent from the combustion of a carbonaceous fuel, the process comprising:

a. injecting a first treatment agent which comprises urea into the effluent at a first temperature zone wherein the effluent temperature at said first temperature zone is greater than about 1700° F.; and b. injecting a second treatment agent which comprises an enhancer selected from the group consisting of hydrogen peroxide and parafinic, olefinic, aromatic, oxygenated and hydroxy amino hydrocarbons, into the effluent at a second temperature zone wherein the effluent temperature is below about 1400° F.;

wherein said first and second treatment agents are injected under conditions effective to lower the effluent pollution index.

24. The process of claim 23 wherein said second treatment agent comprises an aqueous solution of an oxygenated hydrocarbon.

* * * * *